United States Patent
Engel

[11] 3,957,339
[45] May 18, 1976

[54] LASER BEAM SHAPING ARRANGEMENT

[75] Inventor: Simon L. Engel, Mountain View, Calif.

[73] Assignee: Caterpillar Tractor Co., Peoria, Ill.

[22] Filed: July 12, 1974

[21] Appl. No.: 487,914

[52] U.S. Cl. .................................. 350/6; 350/294
[51] Int. Cl.² .......................................... G02B 27/00
[58] Field of Search ............... 350/6, 185, 190, 293, 350/294

[56] References Cited
UNITED STATES PATENTS

| | | | |
|---|---|---|---|
| 1,652,271 | 12/1927 | Cooke | 350/294 |
| 2,692,369 | 10/1954 | Geiser | 350/6 |
| 2,869,423 | 1/1959 | Hoge et al. | 350/294 |
| 2,976,362 | 3/1961 | Stamps | 350/6 |
| 3,191,488 | 6/1965 | Eisner | 356/99 |
| 3,836,225 | 9/1974 | Wilde et al. | 350/6 |

*Primary Examiner*—John K. Corbin
*Assistant Examiner*—Richard A. Rosenberger
*Attorney, Agent, or Firm*—Phillips, Moore, Weissenberger, Lempio & Strabala

[57] ABSTRACT

Apparatus for shaping a laser beam having a substantially ring-shaped cross-section in order to provide even heat distribution at a work station and to adjust the operational size of the beam at said station, comprising a cylindrical reflector positioned to receive and reflect the laser beam and direct the laser beam toward a work station with the beam laterally converged so as to provide a more concentrated even energy distribution at the work station. In a preferred form, the mirror is positioned to be at a focal distance from the work station and has adjusting means for adjusting the mirror to accommodate variations in focal length caused by different work pieces and to allow operation slightly away from focal length, if desired. The preferred form also comprises a second cylindrical reflector adjustably positioned to converge the laser at right angles to the first direction of convergence whereby the length of image of the laser on the work piece may also be adjusted. The cylindrical cross-sections should be conic sections and preferably are circular with the degree of curvature being rather small so as to have rather long focal lengths. In an alternate form, means are also provided to vibrate the beam whereby the image may be caused to oscillate at the work station and to cover a larger fixed area of operation.

10 Claims, 7 Drawing Figures

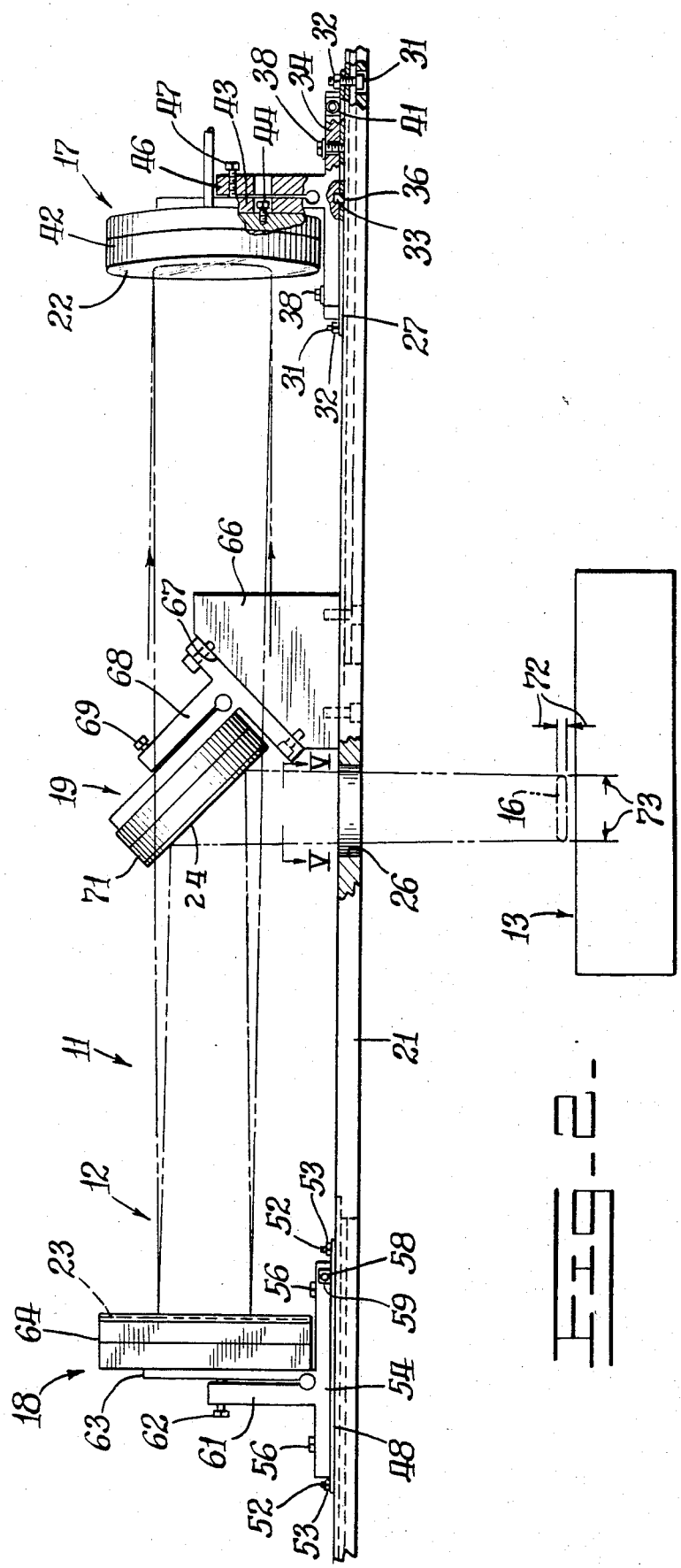

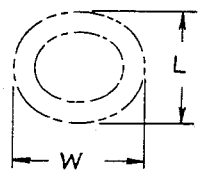
Fig_3.
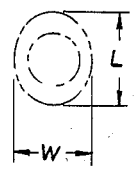
Fig_4.
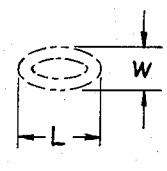
Fig_5.
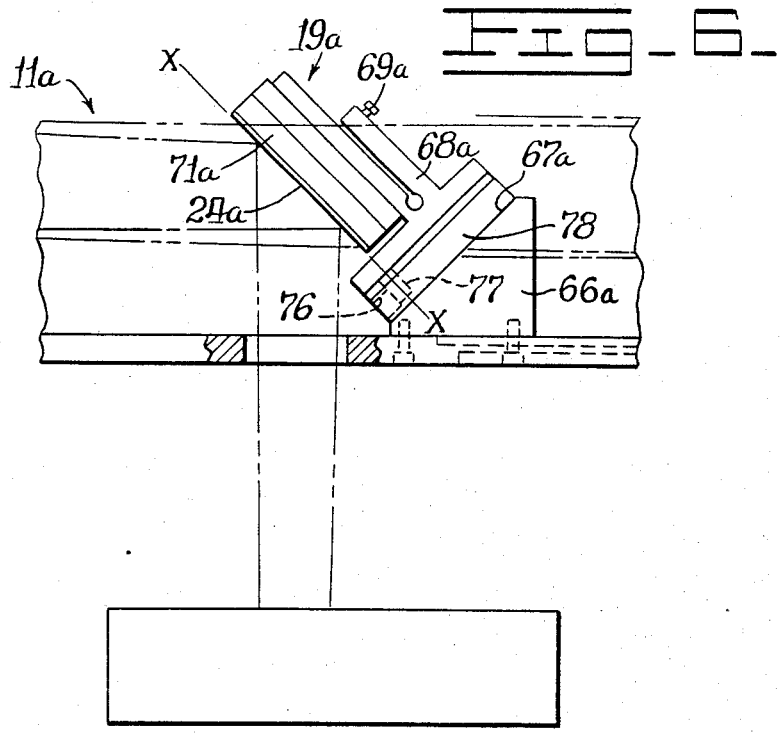
Fig_6.
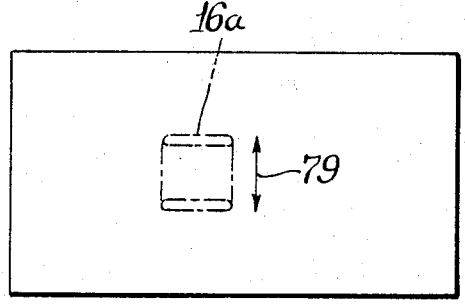
Fig_7.

LASER BEAM SHAPING ARRANGEMENT

BACKGROUND OF THE INVENTION

The present invention relates to an apparatus for shaping a laser beam, and more particularly, for shaping a laser beam having an annular cross-section, in order to provide a more uniform heat distribution at a work station.

It is well known to use high powered carbon dioxide lasers for industrial metal working applications such as heat treating, cutting, welding, shaping and the like. In such applications, the metal piece to be operated upon is moved in a predetermined relationship with respect to the laser beam at a work station. In this way, the residence time and area of coverage is controlled in accordance with desired programming. However, difficulties have been encountered with such industrial laser systems because of the configuration of the laser beam itself and its energy distribution, particularly when such lasers are used for heat treating.

For example, laser beams are generally circular in cross-section, and the high powered carbon dioxide lasers now employed generally for heat treating and the like have an annular shape or ring-like cross-section. This causes a greater concentration of energy along the outer edges of the heat treated area than in the middle portion, thereby causing uneven heat treatment of the piece part being operated upon.

It is therefore seen that a problem exists in the high powered laser beam art, and that improvements are needed in order to effect a more uniform heat distribution on work pieces, which are to be operated upon by such lasers. Accordingly, the present invention is directed toward a solution to such problems.

SUMMARY OF THE INVENTION

It is therefore a primary object of this invention to provide an apparatus for shaping an electromagnetic beam such as a laser beam which provides a more even heat distribution in a simple and reliable manner.

In accordance with the invention, cylindrical mirrors are used to cause the laser beam to converge in one direction so as to provide a linear focus having a rather even heat distribution. This system has been found to be particularly valuable where the laser beam has a ring-like cross-section, because it substantially eliminates the hole in the center of the beam. The use of the cylindrical mirror for convergence in one direction only has the advantage that the laser beam can retain a definite length, and the linear focus achieved is much better than the utilization of a point of focus, which would be obtained by ordinary spherical, concave mirrors. In accordance with the invention, a second concave reflecting means is also interposed in the path of travel of the laser beam, which means is utilized to control the length of the band of the beam at the work station. In this way, a controlled beam of definite length and narrow width is obtained at the work station, and this beam has the desired uniform heat distribution.

In order to provide accurate adjustment for the first and second reflecting means, each of the means is mounted for axial movement with respect to the laser beam so as to vary the distance between each of the mirrors and the work piece, thereby varying the degree of convergence. At the same time, the mirrors are also provided with adjusting means for adjusting the mirror angle to compensate for said linear adjustment and to provide accurate positioning of the image at the work station. With this arrangement, a controlled image of the desired length and width can be obtained at the work station. In addition, the image has improved heat distribution characteristics when compared to the original laser beam.

In general, the concave cylindrical mirrors will have a cross-section, which is one of the typical conic sections in order to provide a substantially uniform convergence, and the preferred conic section is circular. This allows an accurate reflector to be easily fabricated. With a circular cross-section, the image does not come to a theoretical line focus, but will have a definite band width. This band width is considered desirable, although it will be appreciated that parabolic reflectors could be used where the band width would be theoretically zero. Of course, in actual optical devices, distortions are present which avoid the theoretical linear image from parabolic cylindrical reflectors, and which also cause the theoretical band width of circular cylindrical reflectors to be slightly larger than otherwise calculated. However, once again this slight spread is considered to be of advantage since the hole in the middle of the beam has been eliminated in any event at this focal area. Accordingly, it is preferred to operate at or near the focus for one of the reflecting means.

In the event a wider image is desired than that obtained by the focal band, deviations may be permitted by operating at some distances from the focus, and yet having a sufficiently improved even heat distribution. If desired, additional reflector means may be provided, and in the preferred form a flat surfaced reflecting means is used to change the direction of the laser beam. With this arrangement, the work station is conveniently placed below the apparatus.

In accordance with another embodiment of the invention, means are also provided for oscillating the laser beam in a direction normal to the line of substantially linear focus. This oscillating means provides a sweep of the beam through a preset width, whereby such width may be uniformly covered by the laser beam. Preferably, the desired oscillation of the beam is obtained by vibrating the flat reflector means although it will be appreciated that the beam may be oscillated by vibrating any one of the reflecting means.

It is thus seen that another object of the invention is to provide an apparatus for shaping laser beams, which apparatus is capable of accurately adjusting the size of the image and fixing the location thereof.

A further object of the invention is to provide an apparatus having the above mentioned advantages, which is constructed with a minimum of parts and which is absolutely reliable in operation.

Further objects and features of advantage of the invention will become apparent as the specification progresses.

BRIEF DESCRIPTION OF THE DRAWINGS

The preferred forms of the invention are illustrated in the accompanying drawings forming a part of this description, in which:

FIG. 2 is an elevational view of the apparatus shown in FIG. 1;

FIG. 3 is a view illustrating the cross-section of a laser beam substantially as seen in the plane of line III—III of

FIG. 1;

FIG. 4 is a cross-sectional view of the laser beam illustrating the cross-section of the laser beam substantially as seen in the plane of line IV—IV of FIG. 1;

FIG. 5 is a cross-sectional view of the laser beam substantially as seen in the plane of line V—V of FIG. 2;

FIG. 6 is an elevational view illustrating an alternate embodiment of the invention; and FIG. 7 is a plan view illustrating the image at the work piece and the movement thereof, when obtained by the alternate form of the invention shown in FIG. 6.

Figure 1:
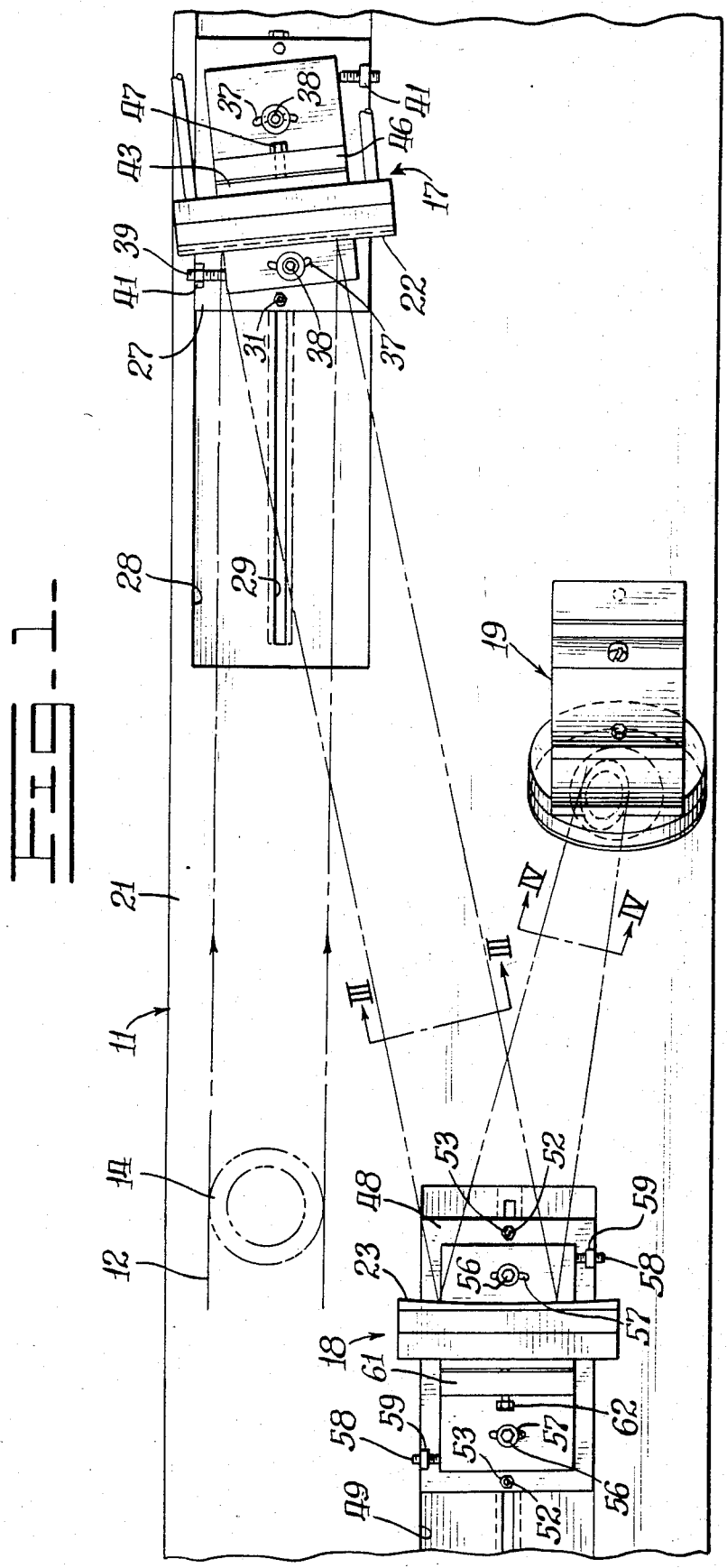
FIG. 1 is a plan view of an apparatus constructed according to the invention and illustrating an overall arrangement of parts.

While only the preferred forms of the invention are shown, it should be understood that various changes or modifications may be made within the scope of the claims attached hereto without departing from the spirit of the invention.

DETAILED DESCRIPTION OF THE PREFERRED EMBODIMENTS

Referring more particularly to the drawings, there is shown an apparatus 11 for shaping an electromagnetic energy beam such as a laser beam 12 and directing the shaped beam to a work station 13 for operative use of the shaped beam. In its preferred form, the laser beam 12 has an annular or ring-like cross-section as indicated in the rotated phantom diagram 14 of FIG. 1, and this configuration is preferably shaped to the reduced narrowed substantially rectangular shape 16 at work station 13 as shown in the phantom diagram 16 of FIG. 2. In this way, the shaping apparatus substantially eliminates the hole in the center of the beam, and provides it in a form more suitable for evenly heating work parts at the work station 13. In accordance with usual procedures, the piece part to be operated upon is conveyed through the work station, where it is impinged upon by the shaped laser beam 12, with the areas of contact, residence time and other factors being controlled by the movement of the work piece.

As shown in the drawings, the apparatus 11 comprises a first reflector means 17, a second reflector means 18, and a third reflector means 19; all of which are carried on a suitable frame 21. Although the orientation of the device is immaterial, it will be described with the frame 21 being a rectangular plate-like configuration lying in a horizontal plane with the various reflector means being mounted thereon. As here shown, first reflector means 17 has a concave cylindric surface 22 with the axis of the cylinder being substantially parallel to the surface of the frame 21 or horizontally disposed. This mirror surface has an exceedingly long focal length so that the convergence, which takes place in the vertical plane only, is only partially effected when the laser beam reaches the work station. Therefore, this mirror is utilized to reduce the long dimension of the substantially rectangular image at the work piece, and as shown in FIG. 3, only a small amount of convergence of the vertical components is achieved after a considerable distance from the mirror has been traversed by the laser beam.

After reflection from the first reflector means 17, the laser beam 12 is then reflected from the second reflector means 18, which has a concave reflecting surface 23. This reflecting surface 23 is also a cylindric surface, but its cylindric surface is oriented vertically with respect to the horizontal frame or at 90° from the orientation of the first reflector means 17. This causes convergence of the laser beam in the horizontal direction. The reflecting surface 23 also has a greater degree of convergence than reflecting surface 22, and, as shown in FIG. 4, considerable horizontal convergence of the laser beam has already taken place in the position indicated in the plane of line IV—IV of FIG. 1.

After being reflected from reflecting surface 23, the laser beam 12 is then reflected from reflector means 19 which simply has a first mirrored surface 24 positioned at an angle of about 45° from the frame 21 so as to direct the laser downward through aperture 26 to work station 13 as shown in FIG. 2. As the laser beam approaches the work station, it first assumes the configuration shown in FIG. 5 as it passes through the plane of line V—V of FIG. 2, and then it assumes the shape 16 at the work station.

Preferably, the degree of curvature of the second reflector means 18 and the spacing from the work station is such that the line of focus of the cylindrical reflecting means lies right on the work piece. However, it will be appreciated that the beam configuration at the line of focus will have a certain amount of width because of several factors.

First of all, the preferred reflecting surface is circular in cross-section so that the theoretical focus will have a definite width determined by the ratio of the focal length and width of mirror surface utilized. In addition, imperfections in surface manufacture and the like also provide a certain amount of deviation from the theoretical so that the image will have a width, and the width will be substantially uniform in intensity so as to provide a better heat treating image. If desired, the work station can be placed slightly in advance of or behind the actual focal plane without unduly altering the desired substantially uniform characteristics of the beam, and such placement may also add a slight width to the laser beam at the work position.

In the event it is desired to operate over a still wider area, the embodiment illustrated in FIG. 6 may be utilized. This embodiment provides a means of oscillating the image back and forth so as to increase the effective width thereof, and still maintain a substantial uniformity of intensity throughout the operating area.

In order to provide accurate placement of the image, and an adjustability of the position of focus at the work station to accommodate pieces of varying width, it is important to provide mountings for the various reflector means, which are both adjustable and optically accurate in their positioning. Accordingly, each of the reflector means is made to be adjustable, yet carried on a firm support, and with adjusting means that can be operated in cooperation with the laser beam, so as to exactly position the beam in accordance with the usual techniques for aligning and adjusting optical equipment.

Referring again to the drawings, it is seen that the first reflector means 17 is carried on a base plate 27 in the form of a rectangular block, which is fit into a recess 28 formed in the frame 21. The recess 28 has a width large enough to accommodate the base plate 27, and a length larger than the plate 27 to permit axial movement of the base plate 27 within the recess. An elongated, inverted, T-shaped slot 29 is also provided within recess 28 to accommodate a pair of bolts 31 which extend through the plate 27 and are secured by nuts 32. With this construction, axial adjustment of the first reflector means 17 is effected by moving the entire means through movement of base plate 27 in recess 28 and securing the plate in the desired position by tightening the nuts 32.

The base plate 27 is formed with an upstanding pivot pin 33 centrally located thereon, and a T-shaped mounting bracket 34 having a central bore hole 36 is fit over the pivot pin. Thus, the mounting bracket 34 has an abutting surface fitting on the upper surface of base plate 27 and is horizontally fixed thereon by the pivot pin but free to rotate with respect thereto. In order to adjustably retain the rotation of the mounting bracket, a pair of arcuate slots 37 are formed in the mounting bracket, and a pair of cap screws 38 are provided to fit through said slots and be threaded into the base plate. With this construction, cap screws 38 can be loosened, the mounting bracket rotated to the desired position, and the cap screws secured to retain the mounting bracket rigidly in place.

Since the rotational position of the mounting bracket must be adjusted quite accurately, means are provided for effecting fine adjustment in the form of a pair of set screws 39 positioned to abut the sides of the mounting bracket 34 at two locations near diagonally opposed corners. As seen in FIG. 1, the set screws are carried by the base plate 27 through a pair of threaded upstanding lugs 41.

A fluid-cooled reflecting mirror 42 having the previously described reflecting surface 22 is carried on the mounting bracket 34, with fastening means being provided to permit accurate vertical adjustment with respect to the mounting bracket and, in that way, to permit fine adjustment of the incoming laser beam 12. Thus the upstanding portion of the mounting bracket is bifurcated to provide two side-by-side structures substantially parallel to the mirror 42. The forward portion 43 is secured to mirror 42 through screw 44, while the rearward portion 46 carries set screw 47 threadably secured therein. The rearward portion 46 is made more rigid than the forward portion 43 so that on rotation of set screw 47 and resultant spreading of the bifurcated portions, causes a slight forward tilt of the mirror assembly 42. Conversely, reverse turning of set screw 47 allows the two portions to spring back and reverse the tilting effect. With this construction, exceedingly fine vertical adjustment of the mirror may also be made in order to assure the exact optical alignment.

The second reflector means 18 is similarly constructed, and mounted in the same way as the first reflector means 17. The only difference being in the configuration of the reflecting surface 23 as opposed to the reflecting surface 22.

Thus second reflector means 18 is carried on a base plate 48, which in turn is fit into a rectangular recess 49 cut into frame 21 in a diagonally disposed position from recess 28. Recess 49 has an inverted T-shaped slot 51 extending axially therethrough, and formed to receive bolts 52 which are tightened by nuts 53 for adjusting the axial position of base plate 49. Fitting over base plate 48, is a mounting bracket 54, which is mounted for rotation through a pivot pin (not shown) in the same manner as the mounting of mounting bracket 34. A rotational position of the mounting bracket 54 is adjustably secured by tightening set screws 56, which extend through arcuate slots 57 and are threaded into the base plate 48.

In order to accurately adjust this rotational position, a pair of set screws 58 are threaded through lugs 59, which in turn are provided on base plate 48. Mounting bracket 54 is also bifurcated with the rear portion 61 having set screw 62 threaded therethrough and bearing against the front portion 63 upon which mirror 64 is secured. Mirror 64 is also fluid-cooled and constructed to reflect high energy laser beams.

The third reflector means 19 is utilized in the main embodiment simply to change the direction of the laser beam and provide a more convenient setup. Accordingly, this reflector means could be theoretically omitted and the device still be operative. However, in the preferred form, such means is provided to divert the laser beam through the aperture 26 to the work station 13, and thus provide a more convenient setup.

As here shown, the third reflector means 19 is carried on a mounting block 66, which is fastened to the main frame 21 at the desired location so that the mirror will be placed over the aperture 26. The mounting block 66 has a 45° angled surface 67 on which a T-shaped mounting bracket 68 is secured. The T-shaped mounting bracket 68 is similarly constructed to mounting brackets 34 and 54, with bifurcated portions and an adjusting set screw 69. A water cooled plane mirror 71 is secured to the mounting bracket 68 so that its reflecting surface 24 is disposed substantially 45° from the plane of frame 21, and this angle may be accurately adjusted for optical alignment by adjustment of set screw 69.

In order to place the apparatus in operation, the size and position of the desired image at the work station 13 is determined, and either a high energy optical beam or low energy laser may be used to align the optical parts. With the test beam in place, and the mirrors adjusted so that the beam impinges at the work station, the second reflector means 18 is first moved in gross within recess 49 to achieve the desired image width as indicated by arrow 72 of FIG. 2. This width is preferably at or near the focus for the cylindric surface. As this adjustment is made, the first and second reflector means are swivelled sufficiently to maintain optical alignment for positioning the beam.

With the width thus determined, the length of image as indicated by arrows 73 of FIG. 2 is adjusted, by moving the first reflector means 17 longitudinally within recess 28, while again maintaining sufficient swivel on both mirrors to provide optical alignment. When these desired dimensions are thus obtained, the base plate of each of the first and second reflecting means are secured by tightening the bolts on their respective base plates and this adjustment is completed.

The desired lateral location of image width 72 is obtained by adjusting the rotation of the first and second reflector means 17 and 18, and when the desired location and optical alignment is achieved, these rotations are secured by tightening the associated screw means on these devices as described above. Optical alignment along a horizontal between the incoming laser beam and the first and second reflector means is obtained by turning the small set screws on the bifurcated mounting brackets, and this completes the setting of the first and second reflector means. The third reflector means is then utilized for final location of the horizontal directions 73 of the image at work station 13 by adjustment of set screw 69, which in turn fixes the final tilt of the third flat reflecting means. With the mirrors thus adjusted, the high energy laser beam is made ready for use in conducting the desired treatment at the work station.

As indicated above, it is preferred to have one of the reflector means cause convergence of the laser beam to the line of focus, and preferably it is the reflector means nearest the work station in order to provide less width to the focus. In addition, some additional width may be provided near to, instead of at, the focus. However, if the work piece is placed too far from the focus, a hole will again appear within the laser beam. Accordingly, it is preferred to continue to operate substantially at the focus, and to provide additional width by oscillating one of the three reflecting means.

The oscillation should be very slight since the distance from the reflectors is relatively great, and small angles become multiplied. For this reason, the reflecting means closest to the work piece is the preferred one for effecting such oscillation. In addition, this reflecting means is of flat configuration, and more simple in adjustment than the other two reflecting means.

As used herein, the expression "oscillating" is intended to mean vibrations which may be of very short amplitude. A typical example of the system, which is so constructed, is shown in FIG. 6 where a third reflector means 19a is shown mounted on the apparatus 11a, which is in all other respects similar to the apparatus 11 of the embodiments of FIGS. 1 through 5. In addition, the third reflector means 19a is similar to the reflector means 19, and comprises a mounting block 66a having a diagonal surface 67a carrying a mounting bracket 68a thereon with the mounting bracket having a set screw 69a for fine adjustment, all as in the embodiment of FIGS. 1 and 2. The structure of FIG. 6 also has mirror 71a and flat reflective surface 24a so that the unit may function exactly the same as in the embodiment of FIGS. 1 and 2.

However, the third reflector means 19a also comprises oscillating means for rotatably oscillating the reflector means 19a. As here shown, the oscillating means comprises a vibrator 76 operatively connected to a shaft 77 which is journalled for rotation in the base plate 78, on which mounting bracket 68a is rotatably positioned. It should be noted that the shaft 77 is placed so that the vibrational movement or oscillation will occur around the axis marked X—X in FIG. 6, so as to be centered across a central portion of the flat reflective surface 24a. With this construction, the image shape 16a of the laser beam will move back and forth as indicated by arrow 79 in FIG. 7. The work piece is then preferably moved in the direction normal to the sweeping path of the laser beam or in the direction perpendicular to arrow 79. Oscillating the beam in this manner, minimizes any disparities which may be present in the laser beam and provides excellent heat distribution.

From the foregoing description, it is seen that a laser beam shaping apparatus is provided which shapes a laser beam having an annular configuration into a concentrated somewhat rectangular beam of controlled size having substantially uniform heat distribution. Accordingly, an improved laser beam shaping apparatus is provided, which provides an improved laser beam impingement on work pieces for heat treating or other operations.

What is claimed is:

1. Apparatus for shaping an annular beam of electromagnetic energy to evenly distribute the energy thereof over a generally rectangular area of selected width and length, comprising means for providing said annular beam, a first concave cylindrical reflector means positioned to receive said beam and providing convergence of said beam in a first dimension normal to the axis of said beam, a second concave cylindrical reflector means positioned to receive said beam from said first reflector means and providing convergence of said beam in a second dimension normal to both said first mentioned dimension and the axis of said beam, a third reflector means comprising a flat reflecting mirror positioned to receive said beam from said second reflector means, a work station positioned to receive said beam after reflection from said third reflector means, said first reflector means having a longer focal length than said second reflector means and said work station being positioned substantially at the line of focus of said second reflector means, and means vibrating said third reflector means to cause oscillation of said beam in a direction normal to said line of focus of said second reflector means.

2. Apparatus for shaping an annular beam as defined in claim 1, which also comprises first linear adjusting means for adjusting the position of said first concave cylindrical reflector means along the axis of said beam, first angular adjusting means for adjusting the angular relation of said first reflector means to said beam, second linear adjusting means for adjusting the position of said second concave cylindrical reflector means along the axis of said beam, and second angular adjusting means for adjusting the angular relation of said second reflector means to said beam, whereby the length and width, respectively, and position of impingement of said beam on said third reflector may be fixed.

3. Apparatus for shaping a laser beam having a substantially ring-shaped cross-section, comprising:
 a main frame;
 a reflector means positioned to receive said laser beam and direct said beam toward a work station, said reflector means comprising a base plate adjustably carried on said main frame for adjustment in a direction parallel to the axis of said laser beam, a mounting bracket mounted on said base plate, pivot pin means for allowing relative rotational movement of said mounting bracket with respect to said base plate around an axis perpendicular to said base plate, rotational adjusting means for adjusting and fixing the rotational position of said mounting bracket with respect to said base plate, and a mirror carried on said mounting bracket receiving said laser beam and directing said beam toward said work station, said mirror being formed with a concave cylindrical reflecting surface having a linear axis perpendicular to said main frame whereby the operative distance of travel of said beam between said mirror and said work station may be adjusted at substantially the focal length of said mirror to provide a narrow elongated converged beam at said work station; and
 means for oscillating said laser beam, whereby the impingement of said laser beam at said work station is caused to oscillate back and forth in a direction normal to the elongated dimension of the substantially focused beam at said work station.

4. Apparatus for shaping an annular beam as defined in claim 3, in which each of the two concave cylindrical reflector means have a cross-section which is substantially of the configuration of a conic section.

5. Apparatus for shaping an annular beam as defined in claim 4, in which each of the two concave cylindrical reflector means has a cross-section which is substantially of the configuration of a circular arc.

6. Apparatus for shaping an annular beam as defined in claim 5, in which a third reflector means is provided to direct said beam out of its main plane of reflection, said third reflector means comprising a flat reflecting mirror.

7. Apparatus for shaping an annular beam as defined in claim 6, in which the third reflector means is vibrated to cause oscillation of said beam in a direction normal to its line shaped image from said second reflector means.

8. Apparatus for shaping a laser beam as defined in claim 3, which also comprises a second concave cylindrical reflector means having a second concave reflecting surface formed to converge the laser beam in a direction of convergence of the first mentioned reflector means, said second reflecting surface having a focal length sufficiently long that partial convergence of the laser is effected at the work station.

9. Apparatus for shaping a laser beam as defined in claim 8, in which the second reflector means comprises a second base plate adjustably carried on the main frame for adjustment in a direction parallel to the direction of the laser beam directed toward said second reflector means, a second mounting bracket mounted on said second base plate for rotational movement with respect thereto, second rotational adjusting means for adjusting and fixing the rotational position of the second mounting bracket with respect to the second base plate, and a second mirror carried on the second mounting bracket, said second mirror being formed with said second concave reflecting surface.

10. Apparatus for shaping a laser beam as defined in claim 9, in which the first and second reflecting surfaces each have arcuate cross-sections which are substantially circular arcs.

* * * * *